United States Patent
Yuan et al.

(10) Patent No.: US 6,567,378 B1
(45) Date of Patent: *May 20, 2003

(54) CELL DISCARD SCHEME FOR IP TRAFFIC OVER A CELL RELAY INFRASTRUCTURE

(75) Inventors: Ruixi Yuan, Waltham, MA (US); William Timothy Strayer, West Newton, MA (US); Bora Akyol, Chelmsford, MA (US)

(73) Assignees: Genuity Inc., Burlington, MA (US); Verizon Corporate Services Group Inc., Irving, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/220,613

(22) Filed: Dec. 24, 1998

(51) Int. Cl.$^7$ .............................. H04L 12/56; H04J 3/14
(52) U.S. Cl. .................. 370/235; 370/389; 370/395.1; 370/412
(58) Field of Search ................... 370/230, 235, 370/394, 395.1, 395.41, 395.53, 389, 412, 414, 416, 428, 429

(56) References Cited

U.S. PATENT DOCUMENTS

| 5,233,606 A | * | 8/1993 | Pashan et al. ........... 340/825.5 |
|---|---|---|---|
| 5,414,702 A | * | 5/1995 | Kudoh .................... 370/395.7 |
| 5,715,250 A | | 2/1998 | Watanabe .................. 370/395 |
| 5,764,641 A | * | 6/1998 | Lin ............................ 370/412 |
| 5,838,677 A | * | 11/1998 | Kozaki et al. .............. 370/230 |
| 6,122,253 A | * | 9/2000 | Jones ........................ 370/235 |

* cited by examiner

Primary Examiner—Alpus H. Hsu
Assistant Examiner—Afsar M Qureshi
(74) Attorney, Agent, or Firm—Leonard Charles Suchyta; James K. Weixel

(57) ABSTRACT

A cell relay switch includes an output port for transmitting cells to multiple destinations. The output port further includes a queuing buffer, a controller, and an output processor. The buffer receives a plurality of cells of a packet from a source. The buffer temporarily stores the cells before transmission by the output processor. The controller controls the storing of the received cells in the buffer by determining a total number of the cells in the packet and a number of cells to be received from different packets, deciding whether the buffer contains sufficient space to store the received cells based on the total number of cells in the packet, the number of cells to be received from the different packets, and the rates at which cells are received and drained from the buffer. The buffer is commanded by the controller to store the received cells when the buffer contains sufficient space and discard the received cells when the buffer contains insufficient space.

20 Claims, 7 Drawing Sheets

CELL DISCARD SCHEME FOR IP TRAFFIC OVER A CELL RELAY INFRASTRUCTURE

FIELD OF THE INVENTION

The present invention relates generally to cell relay systems and, more particularly, to a system that selectively controls the discarding of information.

BACKGROUND OF THE INVENTION

Cell relay systems, such as asynchronous transfer mode (ATM) systems, transmit data over a network as a plurality of fixed-length cells. The individual transmissions typically include one or more cells that constitute a portion of variable-length packets used by end systems or applications. Before transmission, a source station segments a packet into one or more cells and then transmits the cells.

A destination station, after receiving all of the cells associated with the packet, reassembles the cells and provides them to the end system or application. If a portion of the packet (i.e., one or more cells) becomes corrupt or dropped during transmission, the entire packet becomes corrupt. The end system or application typically has no use for the remaining cells of a corrupt packet.

In an ATM system that uses ATM adaption layer 5 (AAL5), the system establishes a particular route or "virtual circuit" over which the cells travel between the source station and the destination station. The source station transmits the cells over the virtual circuit in order and the cells arrive at the destination station in the same order. Sometimes cells from other packets traveling over a different, intersecting virtual circuit interleave with the cells and, thus, alter their time but not their order of arrival at the destination station. The destination station extracts the cells based on virtual circuit information included in the cells before it reassembles them into the associated packets.

Problems arise when the network becomes congested and intermediate switches contain insufficient buffer capacity to handle incoming traffic. Conventional switches discard incoming cells when their buffers are full. Then, when sufficient buffer space becomes available, they store incoming cells again. Accordingly, the switches may discard a portion of a packet and retain the preceding and succeeding portions, or fragments of the packet. These essentially useless packet fragments continue to travel over the network, consuming network resources.

In addition, because conventional switches store useless packet fragments in their buffers, this valuable buffer space becomes unavailable to the cells of complete or "good" packets. In other words, the switches discard good cells while also storing useless packet fragments. Typically, packets with discarded good cells must be retransmitted, adding to the network congestion.

Therefore, a need exists for a discard scheme that improves packet throughput during periods of network congestion and improves resource allocation among source and destination units when network congestion is present on one cell routing path, but less prevalent along another path.

SUMMARY OF THE INVENTION

Systems and methods consistent with the present invention address this need by providing a cell discard scheme that determines whether to discard a cell of a packet based on the ability of a buffer to store the entire packet.

In accordance with the purpose of the invention as embodied and broadly described herein, a system consistent with the present invention includes a cell relay switch having an output port including a queuing buffer, a controller and an output processor. The output port receives a plurality of cells of different packets from multiple sources. The output processor transmits cells to multiple destinations. Upon receiving the cells, the queuing buffer temporarily stores them before transmission by the output processor.

The controller controls the storing of the received cells in the queuing buffer by determining a total number of the cells in the packet, a rate at which the packets are received, and a number of cells to be received for other packets. The controller further decides whether the buffer contains sufficient space to store the received cells based on the total number of cells in the packet and the number of cells to be received for the different packets, allows storage of the received cells when the buffer contains sufficient space, and discards the received cells when the buffer contains insufficient space.

BRIEF DESCRIPTION OF THE DRAWINGS

The accompanying drawings, which are incorporated in and constitute a part of this specification, illustrate an embodiment of the invention and, together with the description, explain the principles of the invention. In the drawings.

DETAILED DESCRIPTION OF THE PREFERRED EMBODIMENTS

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention provide a cell discard scheme for an output port within a cell relay switch. The output port either guarantees delivery of all of the cells of a packet or drops all the cells beginning with the first one. The output port decides whether to store an incoming cell based on whether the buffer has sufficient capacity to store all of the cells of the associated packet.

Exemplary Cell Relay System

Figure 1:
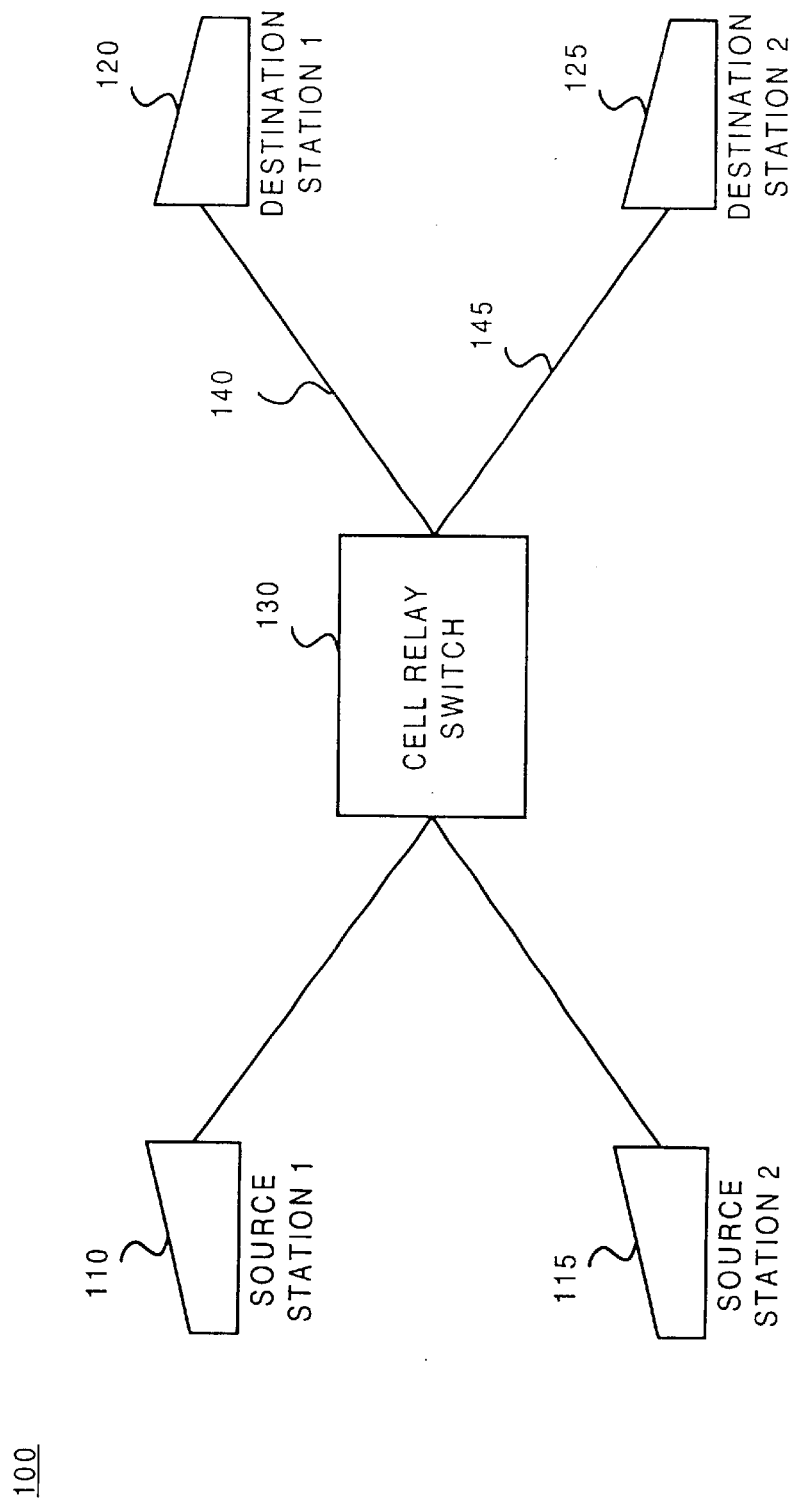
FIG. 1 is a block diagram of an exemplary cell relay network consistent with this invention.

FIG. 1 is a simplified block diagram of a cell relay system 100. The system 100 includes a number of source stations 110 and 115 and a number of destination stations 120 and 125 connected through switch 130 by virtual circuits 140 and 145. The source stations 110 and 115 and destination stations 120 and 125 include computers, such as IBM-compatible computers, workstations, or even "dumb" terminals. While only two pairs of source stations 110 and 115 and destination stations 120 and 125 are shown in FIG. 1, those skilled in the art will recognize that systems and method consistent with the present invention may be used in a network with any number of source and destination stations and any number of switches.

Switch 130 is a cell relay switch that receives multiple cell streams from any source station 110 or 115 and transmits the cells to any destination station 120 or 125. Switch 130 receives and transmits the cells via the virtual circuit 140 or 145. Virtual circuit 140 and 145 are routes established through system 100 by which source stations 110 and 115 transmit the cells to destination stations 120 and 125. Virtual circuit 140 and 145 transmit data at a peak rate (R).

Figure 2:
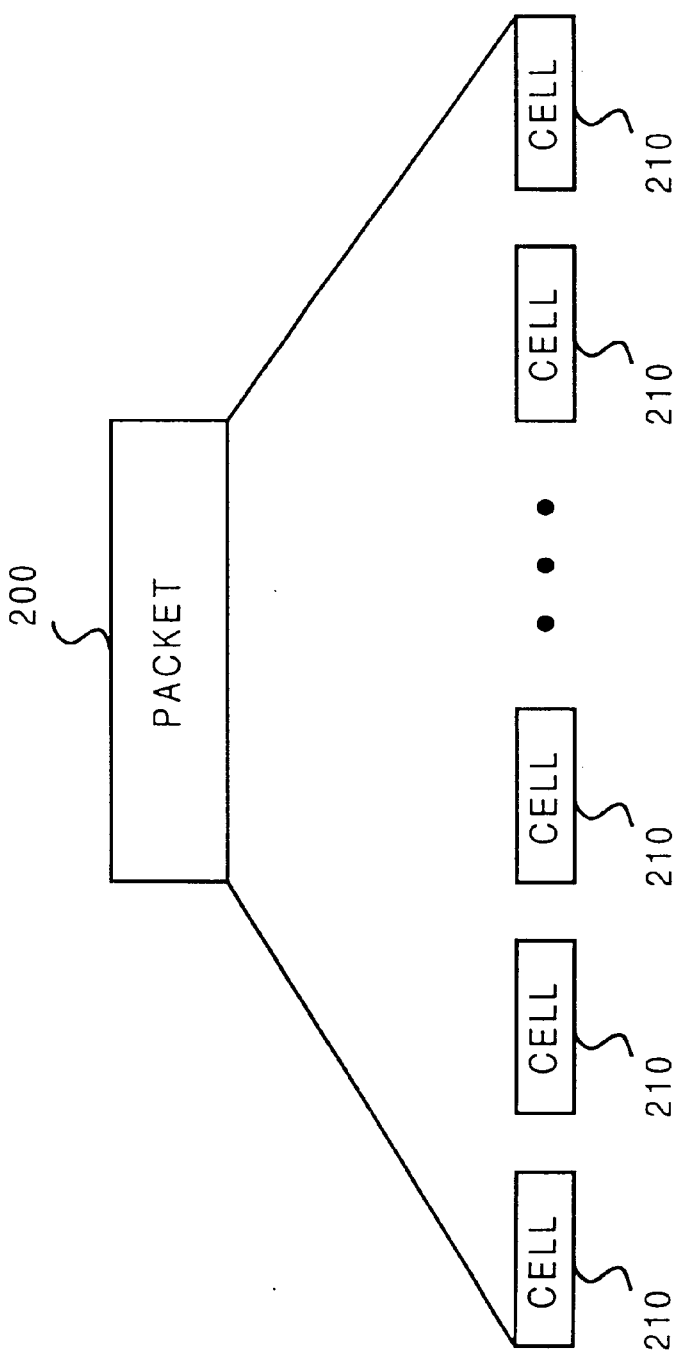
FIG. 2 is an exemplary diagram of a packet transmitted in the network of FIG. 1.

When a source station 110 communicates with a destination station 120 or 125, for example, source station 110 segments a packet of information into a number of cells. FIG. 2 is a diagram of a packet 200. Packet 200 is a variable-length packet, such as an Internet Protocol (IP) packet. Source station 110 divides the variable-length packet 200 into several cells 210 of fixed length.

Figure 3A:
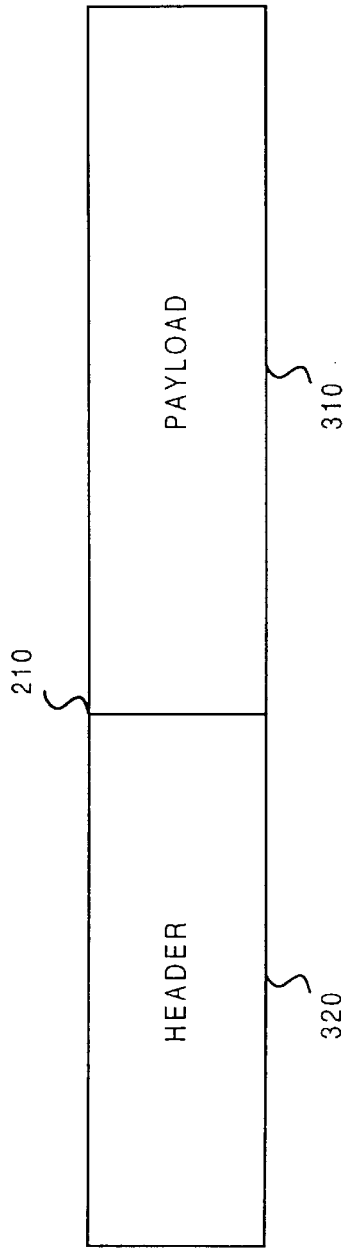
FIGS. 3A and 3B are exemplary diagrams of components of a cell included in the packet of FIG. 2.
Figure 3B:
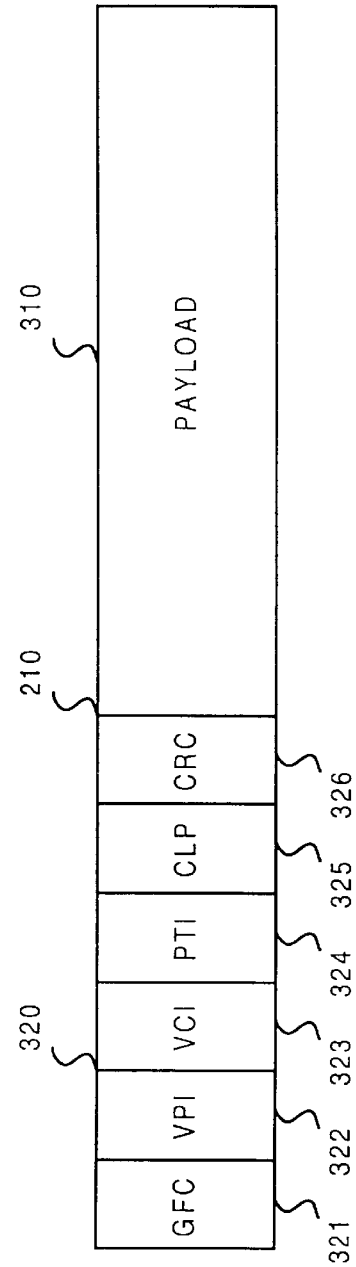

FIGS. 3A and 3B are exemplary diagrams of components of a cell 210 of FIG. 2. The cell 210 includes a payload 310 and a header 320. Payload 310 includes data of fixed-length. FIG. 3B shows the fields included in header 320 for, an ATM-formatted cell. Header 320 includes a generic flow control (GFC) field 321, a virtual path identifier (VPI) field 322, a virtual circuit identifier (VCI) field 323, a payload type identifier (PTI) field 324, a cell loss priority (CLP) field 325, and a checksum (CRC) field 326. The ATM cell is depicted for exemplary purposes only and the present invention may operate on any type of cell format.

Exemplary Output Port

Figure 4:
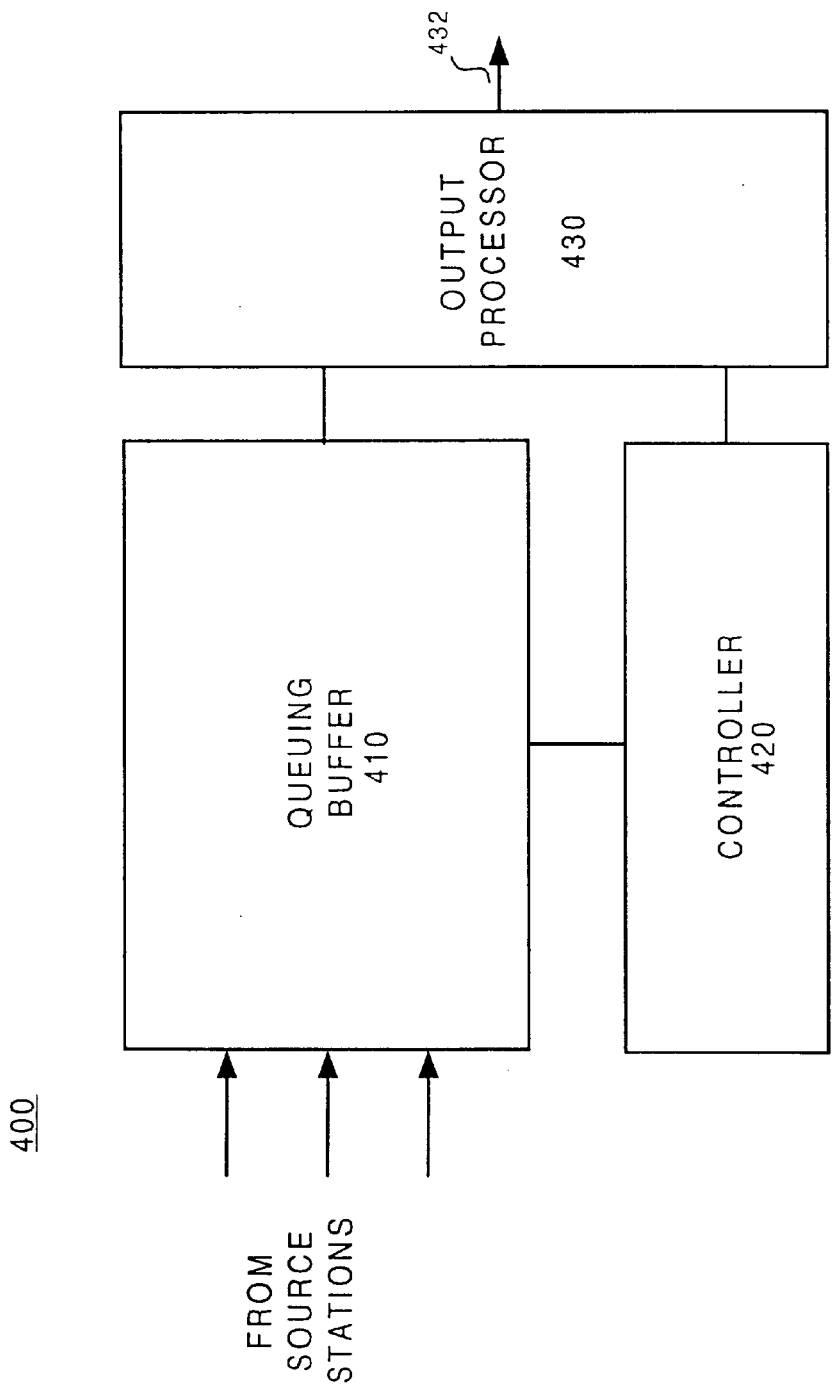
FIG. 4 is a block diagram of an output port residing within the exemplary cell relay switch in the network of FIG. 1.

FIG. 4 is an exemplary block diagram of an output port 400 contained within cell relay switch 130 shown in FIG. 1. Output port 400 includes a queuing buffer 410, a controller 420, and an output processor 430. Queuing buffer 410 receives the packets transmitted by various source stations 110. Output processor 430 relays the packets of cells to a particular destination station 120 via a fiber link 432 or similar communication link.

Queuing buffer 410 temporarily stores the cells received by output port 400 before transmission by output processor 430. Controller 420 includes a standard device, such as a processor, that controls the operation of buffer 410 and output processor 430. Controller 420 executes software to determine which of the received cells will be discarded and which cells will be stored in queuing buffer 410 for transmission by the output processor 430. Controller 420 bases its determination on factors that optimize use of buffer 410. Output processor 430 provides the processing necessary to transmit the selected cells to the destination station 120. As described in greater detail below, this determination is based upon the present occupancy of buffer 410, the size of the packet, and the rate at which the packet is received.

Exemplary Cell Discard Processing

Figure 5A:
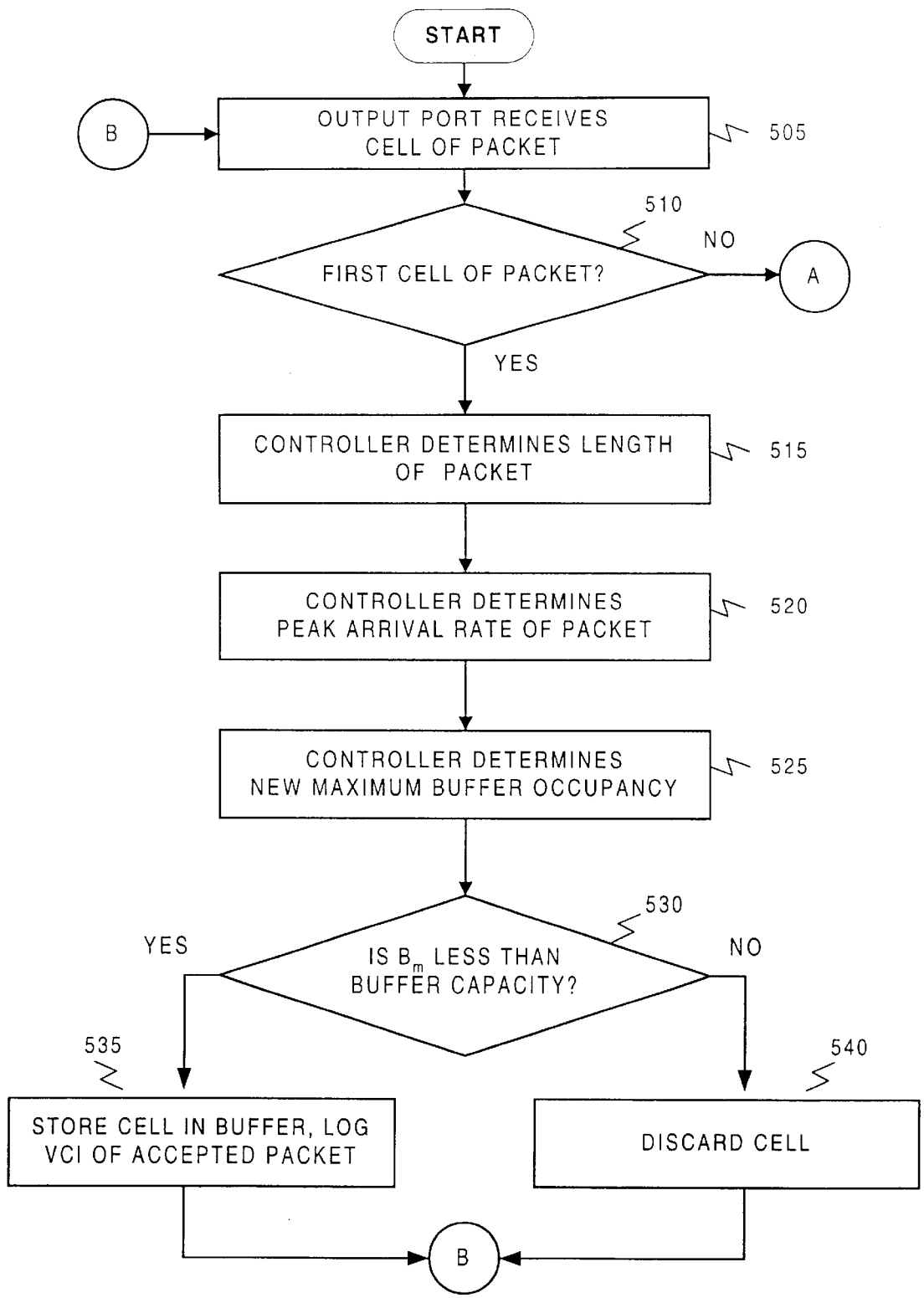
FIGS. 5A and 5B are flowcharts of cell discard processing consistent with the present invention.
Figure 5B:
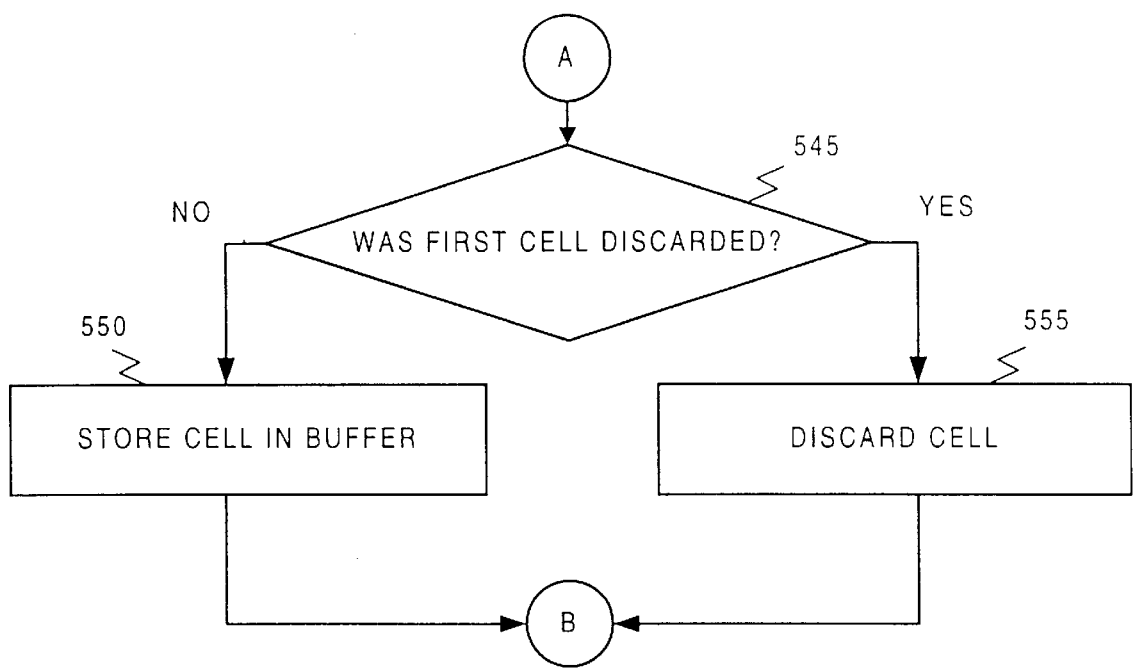

FIGS. 5A and 5B are flowcharts of cell discard processing consistent with the present invention. The processing begins when an output port 400 receives a cell of an incoming packet over a virtual circuit at queuing buffer 410 [step 505]. Each packet has an identifier such as a Virtual Circuit Identifier (VCI), for example, to identify the virtual circuit over which it is carried. Controller 420 processes the incoming cell to determine whether it is the first cell of the packet [step 510]. Controller 420 might make this determination from information provided in the header 320 (FIG. 3B) of the ATM cell, or from information contained within payload 310.

If controller 420 determines that the cell is the first cell, controller 420 next determines the length of the packet $L_x$ [step 515]. This determination may be made from information within cell header 320 or alternatively, from data within the payload of the first cell. Controller 420 also determines the peak arrival rate of the cells $R_x$ of this packet [step 520]. The peak rate information is stored within the switch during the initial virtual circuit setup.

Next, controller 420 calculates the projected maximum buffer occupancy ($B_m$) of output port 400 if the packet was to be accepted [step 525]. To make this determination, controller 420 uses the current condition of output port 400 and the time needed to complete the receipt of the pending packet ($L_x$, $R_x$). In accordance with the present invention, the current conditions of output port 400 may be based upon the current buffer occupancy $B_c$, the rate at which output processor 430 processes (outputs) the cells from the buffer, and the number of cells in the current packet that have yet to arrive.

To simplify the calculations, the rates at which the cells are received are normalized to correspond to the processing rate of output processor 430. If the peak arrival rate of a particular virtual circuit is half the rate of output processor 430, for example, then the normalized rate would be 0.5.

Controller 420 determines the number of cells yet to be received from the total length of the packet. To accomplish this determination, controller 420 contains a mechanism to determine the number of remaining cells that have yet to arrive at buffer 410. For example, the cell may carry a decrementing counter field that explicitly conveys the number of remaining cells. To implement this feature, the system may use the header CRC field 326 (FIG. 3B), for example, as a counter to convey the length of the packet in terms of cells. This limits the length of the packet, however, to 256 cells or 12,288 bytes. Alternatively, controller 420 might contain a counter that decrements when a cell belonging to the same packet and identified with the same VCI has been stored in buffer 410.

If there are currently a total number of N packets accepted by output port 400, then the peak arrival rate of these N packets will be $R_i$, where i=1, 2, ... N. The number of cells of these N packets that have yet to arrive at buffer 410 will be $L_i$, where i=1, 2, ... N. Given the number of remaining cells and the rate at which cells will be received from a given virtual circuit, controller 420 arranges the packets according to completion time such that $$L_1/R_1 \leq L_2/R_2 \leq \ldots \leq L_N/R_N.$$

Figure 6:
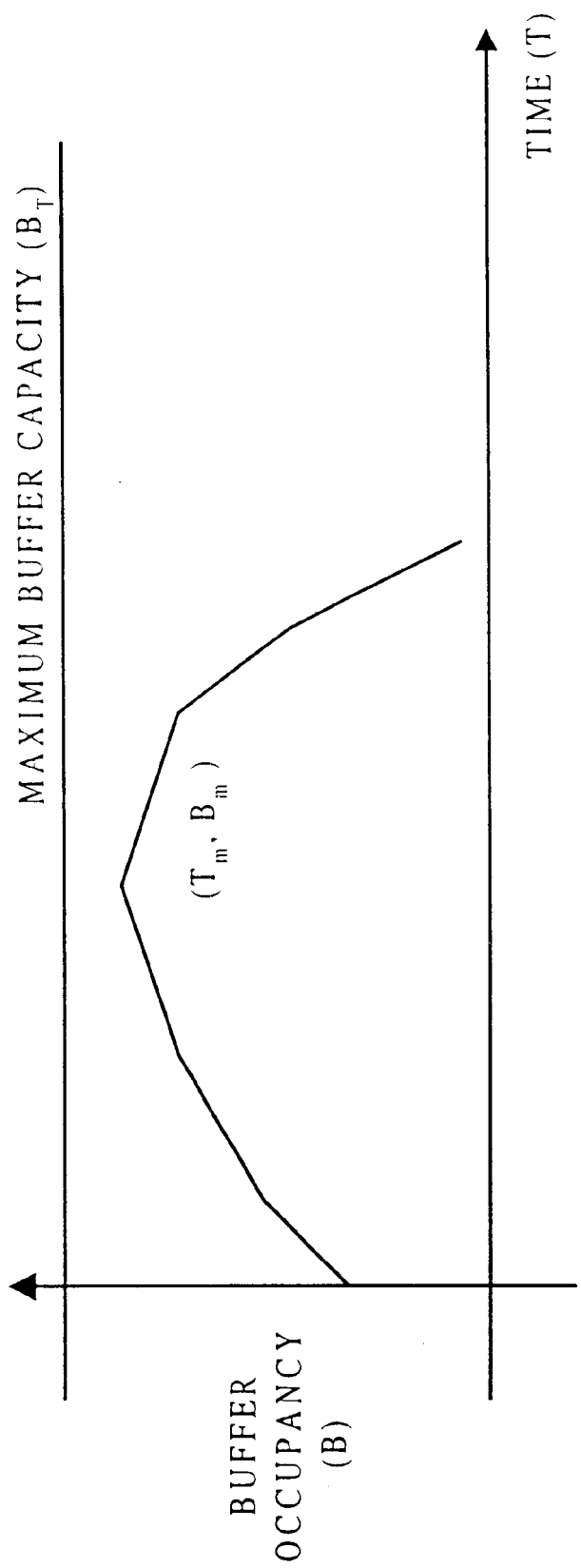
FIG. 6 is a graph of buffer capacity as a function of time.

Once this ordering is established, controller 420 determine's the point at which the buffer occupancy reaches its maximum. FIG. 6 is a graph of buffer occupancy (B) as a function of time (T). The graph shows that the buffer occupancy begins as an increasing function with decreased rate. After the maximum point is reached, denoted ($T_m$, $B_m$), the buffer occupancy becomes a decreasing function with an increasing rate. Initially, the aggregate arrival rate of all the packets is greater than the rate at which the output processor can process the cells in buffer 410. This aggregate arrival rate decreases when all the cells of a packet have arrived at buffer 410, and the packet's contribution to the aggregate arrival rate becomes zero. According to the preferred embodiment, as more and more packets are completed, the aggregate rate will continue to decrease. The maximum point ($T_m$, $B_m$) is reached when the aggregate arrival rate becomes smaller than the processing rate of output processor 430.

To determine the time at which the maximum buffer occupancy ($T_m$, $B_m$) is reached, controller 420 must determine the point at which the aggregate arrival rate becomes less than 1.

Controller 420 adds the peak rates ($R_1$, $R_2$, . . . $R_N$) to determine the point at which the combination of peak rates becomes smaller than 1:

$(R_1+R_2+ \ldots +R_N)>1$ $(R_1+R_3+ \ldots +R_N)>1$

. . .

$(R_j+R_{j+1}+ \ldots +R_N)>1$ $(R_{j+1}+R_{j+2}+ \ldots +R_N)>1$

. . .

$(R_N)>1$

If the rate $R_j$, for example, increases the aggregate arrival rate from $\leq 1$ to greater than 1, then the time at which buffer 410 reached maximum occupancy is $T_m=L_j/R_j$ and the maximum occupancy is $B_m=B_c+L_1+L_2+ \ldots +L_j+(R_{j+1}+ \ldots +R_N)*T_m-(1*T_m)$ In this case, $B_c$ refers to the current buffer occupancy; $L_1+L_2+ \ldots L_j$ are the remaining cells of the packets that will be completed by the time $T_m$; $(R_{j+1}+ \ldots +R_N)*T_m$ refers to the number cells of packets that will not be completed by time $T_m$; and $(1*T_m)$ refers to the total number of cells that will be processed by $T_m$. If the aggregate arrival rate is always less than 1, then controller 420 simply uses $R_N$ as $R_j$ in the calculation.

After determining the current buffer occupancy, controller 420 uses the information including the current conditions of output port 400 to determine whether to accept the newly arrived packet with length $L_x$ and peak rate $R_x$. Specifically, controller 420 inserts the new packet [$L_x$, $R_x$] into the collection of accepted packets [$L_i$, $R_j$], where i=1, 2, . . . , N, and recalculates the new maximum buffer capacity $B_m$ if the new packet were to be accepted.

Based upon the new maximum value, $B_m$, controller 420 must determine whether to accept the incoming cell of the packet based on whether buffer 410 contains sufficient remaining capacity to store the new packet [step 530]. If the new $B_m$ is greater than the physical capacity of buffer 410, then the packet must be discarded because buffer 410 will not have the storage capacity to store the entire packet. If, on the other hand, the new $B_m$ is smaller than the physical capacity of buffer 410, then the cell can be accepted.

If the cell is accepted, controller 420 allows it to be stored in buffer 410 [step 535]. In accepting the new cell, controller 420 logs the $VCI_x$ of the new packet, such that the length, $L_x$, and the rate, $R_x$ of the new packet may be used in future calculation. If the new $B_m$ is larger than $B_T$ (i.e., the maximum capacity), then the full cell packet cannot be accepted for storage and is therefore discarded [step 540]. Upon discarding the cell, controller 420 also logs that the packet identified with $VCI_x$, for example, was discarded and the $L_x$ and $R_x$ of the discarded packet will not be included in future calculations.

Returning to step 510, if the received cell is not the first cell of a packet, then controller 420 determines whether the first cell of the packet was discarded or accepted based upon the VCI of the cell [step 545] (FIG. 5B). Controller 420 might make this determination based on the information stored in the header of the cell, such as the virtual circuit identifier (VCI) field 323 (FIG. 3B). The decision could also be made from information included within the body or payload of the cell.

If controller 420 had accepted the first cell, then it stores the new cell in buffer 410 [step 550]. If, on the other hand, controller 420 discarded the first cell, then it also discards this new cell [step 555]. Regardless of whether controller 420 stores or discards the cell, it prepares itself for receipt of the next cell by returning to step 505 of FIG. 5A. If the cell is stored, then all the remaining cells of the accepted packet are subsequently stored.

The systems and methods consistent with the present invention optimize packet transmission through a cell relay system by guaranteeing that if one cell of a packet is accepted, then all cells of the packet will also be accepted.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

For example, the foregoing description assumed that all cells belonging to the same IP packet arrive at the output port at the same maximum peak rate of the corresponding virtual circuit. In some ATM systems, however, the source station enters into a negotiated traffic contract with the system for packets that it transmits. In this case, the arrival rate depends on traffic shaping performed at the source station.

In multi-hop relay systems, the system sometimes introduces timing jitter into the cell transmission. The timing jitter prolongs the cell arrival rate.

What is claimed is:

1. A method for selectively discarding packets each having a plurality of cells, in a cell relay network that includes a switching mechanism having an output port, the method, executed by the output port, comprising the steps of:

receiving a first cell of a packet;

determining a total number of cells in the packet;

determining a number of cells to be received for a plurality of different packets;

determining an aggregate rate based on adding a rate at which cells in the packet arrive at the switching mechanism and a rate at which cells for the different packets arrive at the switching mechanism;

deciding whether a buffer capacity is sufficient based on the total number of cells in the packet, the aggregate rate, and the number of cells to be received for the different packets;

storing the first cell when the buffer capacity is sufficient; and discarding the first cell when the buffer capacity is insufficient.

2. The method of claim 1, wherein the step of determining a total number of the cells includes the substep of:

reading the total number from a header of the first cell.

3. The method of claim 1, wherein the step of determining a total number of the cells includes the substep of:

reading the total number from a payload section of the first cell.

4. The method of claim 1, further comprising the step of:

determining a current buffer occupancy.

5. The method of claim 4, wherein the step of deciding whether the buffer capacity is sufficient includes the substep of:

determining whether the buffer capacity is sufficient based on the number of cells to be received from the different packets and the current buffer occupancy.

6. The method of claim 1, further comprising the steps of:
receiving a second cell of the packet; and
storing the second cell if the first cell is stored.

7. The method of claim 6, further comprising the steps of:
receiving a subsequent cell of the packet;
storing the subsequent cell of the packet; and repeating the receiving and storing steps until the total number of cells are stored.

8. The method of claim 6, further comprising the step of:
discarding the second cell if the first cell is discarded.

9. A cell relay switch having an output port, comprising:
a buffer that receives a plurality of cells of a packet from a source and temporarily stores the cells before transmission;
an output processor that transmits cells to a destination;
a controller that controls the storing of the received cells in the buffer by determining a total number of the cells in the packet and a number cells to be received from different packets, determining an aggregate rate based on adding a rate at which cells in the packet arrive at the cell relay switch and a rate at which cells for the different packets arrive at the cell relay switch, deciding whether the buffer contains sufficient space to store the received cells based on the total number of cells in the packet, the aggregate rate, and the number of cells to be received for the different packets, storing the received cells when the buffer contains sufficient space, and discarding the received cells when the buffer contains insufficient space.

10. The cell relay switch of claim 9, wherein the controller includes
means for reading the total number of the cells in the packet from a header of one of the received cells.

11. The cell relay switch of claim 9, wherein the controller includes
means for determining a current amount of available space in the buffer.

12. The cell relay switch of claim 11, wherein the controller further includes
means for determining whether the buffer contains sufficient space based on the total number of cells in the packet, the number of cells to be received for the different packets, and the current amount of available space in the buffer.

13. The cell relay switch of claim 9, wherein the controller includes
means for storing all of the cells of the packet if any of the cells of the packet are stored.

14. A system for selectively discarding packets each having a plurality of cells, in a cell relay network that includes a plurality of source stations and a plurality of destination stations coupled to at least one switching mechanism having an output port, the output port comprising:
means for receiving a first cell of a packet;
means for determining a total number of cells in the packet;
means for determining a number of cells to be received for a plurality of different packets;
means for determining an aggregate rate based on adding a rate at which cells in the packet arrive at the switching mechanism and a rate at which cells for the different packets arrive at the switching mechanism;
means for deciding whether a buffer capacity is sufficient based on the total number of cells in the packet, the aggregate rate, and the number of cells to be received for the different packets;
means for storing the first cell when the buffer capacity is sufficient; and
means for discarding the first cell when the buffer capacity is insufficient.

15. The system of claim 14, wherein the means for determining a total number of the cells includes:
means for reading the total number from a header of the first cell.

16. The system of claim 14, wherein the means for determining a total number of the cells includes:
means for reading the total number from a payload section of the first cell.

17. The system of claim 14, further comprising:
means for determining a current buffer occupancy.

18. The system of claim 17, wherein the means for deciding whether the buffer capacity is sufficient includes:
means for determining whether the buffer capacity is sufficient based on the total number of cells in the packet, the number of cells to be received from the different packets, and the current buffer occupancy.

19. The system of claim 18, further comprising:
means for discarding the second cell if the first cell is discarded.

20. The system of claim 14, further comprising:
means for receiving a second cell of the packet;
means for storing the second cell if the first cell is stored; and
means for storing the remaining cells.

* * * * *